United States Patent
Choi et al.

(10) Patent No.: US 9,641,967 B2
(45) Date of Patent: May 2, 2017

(54) METHOD AND APPARATUS FOR SHARING LOCATION INFORMATION OF ELECTRONIC DEVICE

(71) Applicant: Samsung Electronics Co., Ltd., Gyeonggi-do (KR)

(72) Inventors: Wonsuk Choi, Seoul (KR); Kwangsub Son, Gyeonggi-do (KR); Suha Yoon, Seoul (KR); Youngeun Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/568,887

(22) Filed: Dec. 12, 2014

(65) Prior Publication Data
US 2015/0172858 A1    Jun. 18, 2015

(30) Foreign Application Priority Data
Dec. 13, 2013  (KR) .................. 10-2013-0155270

(51) Int. Cl.
| | | |
|---|---|---|
| *H04W 4/02* | (2009.01) | |
| *H04M 1/2745* | (2006.01) | |
| *H04M 1/725* | (2006.01) | |
| *G01S 19/14* | (2010.01) | |
| *G01S 5/00* | (2006.01) | |
| *H04W 12/02* | (2009.01) | |
| *H04W 4/20* | (2009.01) | |
| *H04M 1/67* | (2006.01) | |
| *H04L 29/06* | (2006.01) | |
| *H04W 12/08* | (2009.01) | |

(52) U.S. Cl.
CPC ............ *H04W 4/02* (2013.01); *G01S 5/0072* (2013.01); *G01S 19/14* (2013.01); *H04M 1/2745* (2013.01); *H04M 1/72572* (2013.01); *H04W 4/20* (2013.01); *H04W 12/02* (2013.01); *H04L 63/107* (2013.01); *H04L 63/108* (2013.01); *H04M 1/67* (2013.01); *H04W 12/08* (2013.01)

(58) Field of Classification Search
USPC ........................................ 455/456.1
See application file for complete search history.

(56) References Cited

U.S. PATENT DOCUMENTS

| | | | |
|---|---|---|---|
| 6,640,184 B1 | 10/2003 | Rabe | |
| 7,801,542 B1 | 9/2010 | Stewart | |

(Continued)

FOREIGN PATENT DOCUMENTS

| | | |
|---|---|---|
| EP | 1 835 771 | 9/2007 |
| WO | WO 02/060191 | 8/2002 |

OTHER PUBLICATIONS

European Search Report dated Apr. 17, 2015 issued in counterpart application No. 14197576.3-1972.

*Primary Examiner* — Kabir A Timory
(74) *Attorney, Agent, or Firm* — The Farrell Law Firm, P.C.

(57) ABSTRACT

A method and an apparatus for sharing location information of an electronic device. The method includes receiving a request for sharing the location information; determining a sharing level of a party upon the receipt of the request for sharing the location information; obtaining the location information of the electronic device; and changing the obtained location information into location information corresponding to the sharing level and transmitting the changed location information.

15 Claims, 14 Drawing Sheets

(56) References Cited

U.S. PATENT DOCUMENTS

| | | |
|---|---|---|
| 2007/0298813 A1 | 12/2007 | Singh et al. |
| 2008/0090592 A1 | 4/2008 | Tsuchiya |
| 2009/0047972 A1* | 2/2009 | Neeraj .................. G06Q 10/10 455/456.1 |
| 2009/0098888 A1 | 4/2009 | Yoon |
| 2010/0024045 A1 | 1/2010 | Sastry et al. |
| 2010/0262360 A1 | 10/2010 | Hilliar Isaacson |
| 2012/0009900 A1* | 1/2012 | Chawla .................. G06Q 10/10 455/411 |
| 2012/0050033 A1 | 3/2012 | Westen |

* cited by examiner

METHOD AND APPARATUS FOR SHARING LOCATION INFORMATION OF ELECTRONIC DEVICE

PRIORITY

This applications claims priority under 35 U.S.C. §119(a) to a Korean Patent Application filed on Dec. 13, 2013 in the Korean Intellectual Property Office and assigned Serial No. 10-2013-0155270, the entire contents of which are incorporated herein by reference.

BACKGROUND

1. Field of the Invention

The present invention relates generally to a method and an apparatus for sharing location information of an electronic device, and more particularly, to a method and an apparatus for automatically changing a range of sharing location information of an electronic device according to context.

2. Description of the Related Art

Due to the development of digital technologies, various electronic devices (e.g., mobile communication terminals, smart phones, tablet personal computers, or the like) that enable communication and personal information processing are used widely. These electronic devices provide voice calls, video calls, a message sending and receiving function, such as a Short Message Service (SMS) and a Multimedia Message Service (MMS), a navigation function, a location determination function, a photographing function, a reproducing function of images or media (e.g. moving images and music), an Internet function, a messenger function and Social Networking Services (SNS).

Particularly, the electronic device provides location-based services, such as a location determination function and a navigation function. The location-based service is one of the technologies by which the location of an electronic device is determined by using signals of base stations in mobile networks or satellites, and various information services are provided in relation to the determined location. In order to provide location-based services, methods of determining the location are typically based on a Global Positioning System (GPS) as well as cell-identifiers (cell-IDs) of cellular networks or identifiers of Wireless Fidelity (Wi-Fi) networks.

In addition, when a user posts an article on the SNS, such as Twitter® and Facebook®, in a specific region or posts an article about a specific region, such information is shared with acquaintances with a display to show that the user was in the corresponding region. Then, the electronic device may adjust the range of sharing location information according to intimacy of the other person in sharing the location information. For example, the location of the user may be shared with the family in a wide range of sharing the location information, and with his/her friends or co-workers in a narrow range of sharing the location information.

However, unless the user changes the range of sharing the location information, the location information may be shared with others in the fixed range of sharing.

SUMMARY

The present invention has been made to address the above-mentioned problems and disadvantages, and to provide at least the advantages described below. Accordingly, an aspect of the present invention provides a method and an apparatus for automatically changing the range of sharing the location information according to context. That is, when a request for sharing the location information is received, the location information can be shared with the other party. Furthermore, a sharing level of the location information may be dynamically changed according to context so that the changed location information may be shared.

In accordance with an aspect of the present invention, a method of sharing location information of an electronic device is provided. The method includes receiving a request for sharing the location information; determining a sharing level of a party upon the receipt of the request for sharing the location information; obtaining the location information of the electronic device; and changing the obtained location information into location information corresponding to the sharing level and transmitting the changed location information.

In accordance with another aspect of the present invention, an apparatus for sharing location information of an electronic device is provided. The apparatus includes a communication unit configured to receive a request for sharing the location information and transmits the location information; a Global Positioning System (GPS) receiver configured to receive current location information of the electronic device; a sensor unit configured to detect movement and a speed of the electronic device to receive a location change; and a controller configured to receive the request for sharing the location information via the communication unit, determine a sharing level of a party upon the receipt of the request for sharing the location information, obtain the location information of the electronic device, change the obtained location information into location information corresponding to the sharing level, and transmit the changed location information.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
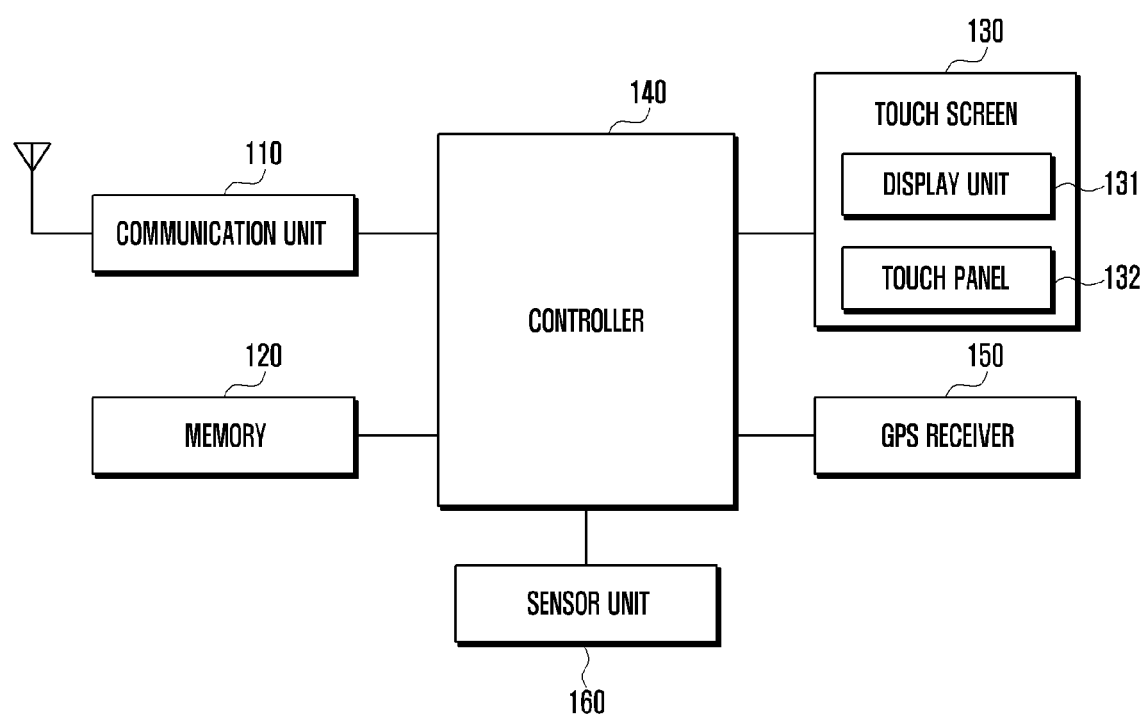
FIG. 1 is a block diagram of an electronic device including a touch device according to an embodiment of the present invention.

Hereinafter, various embodiments of the present invention are described with reference to the accompanying drawings. It should be noted that the same elements will be designated by the same reference numerals although they are shown in different drawings. Further, a detailed description of a known function and configuration which may obfuscate the subject matter of the present invention is omitted. Hereinafter, it should be noted that only the descriptions that facilitate understanding the operations provided in association with the various embodiments of the present invention are provided, and other descriptions are omitted to avoid obfuscating the subject matter of the present invention.

Meanwhile, embodiments of the present invention shown and described in this specification and the drawings correspond to examples presented in order to easily explain technical contents of the present invention, and to facilitate comprehension of the present invention, but are not intended to limit the scope of the present invention. It will be apparent to those having ordinary knowledge in the technical field, to which the present invention pertains, that it is possible to practice other modified embodiments of the present invention based on the technical idea of the present invention as well as the embodiments of the present invention disclosed herein.

An electronic device according to an embodiment of the present invention automatically changes a sharing level of location information and transmits the same to a user to thereby provide a convenience to the user. Accordingly, the sharing level of the location information is configured to be different according to different context, even with respect to the same user.

An electronic apparatus according to the present invention may be a mobile communication terminal, a smartphone, a tablet Personal Computer (PC), a hand-held PC, a Portable Multimedia Player (PMP), a Personal Digital Assistant (PDA), a notebook PC, wearable device (e.g. head-mounted device (HMD) such as smart glasses, electronic clothing, electronic bracelet, electronic necklace, electronic appcessory, electronic tattoo, smartwatch) and the like.

In embodiments of the present invention, the term "sharing level" means the range of the location information to be shared with a party. It is assumed that the sharing level is divided into four levels in the following description. At level one of the four sharing levels, the most accurate location information is displayed on a map. Further, level two enables the display of location information of a zone level, e.g., buildings or a specific region, or a specific regional range configured by the user, on a map. Further, level three provides location information based on cell-IDs in which a wide range of a region is displayed on a map, as compared to level one and/or level two. At level four, the location information is not shared. That is, as the sharing level goes up, a wider range of the location information is shared and displayed.

In addition, in an embodiment of the present invention, the term "adjustment critical value" refers to a reference value for dynamically changing the sharing level. Specifically, a difference value is calculated by comparing status information (e.g., time information or location information) registered in an application with the current status information. The difference value is compared with the adjustment critical value, and if the difference value is within the adjustment critical value, the sharing level of a party is adjusted.

In addition, the location determination according to levels in an embodiment of the present invention is performed by selecting the sharing level after the location determination and/or by determining the location according to the sharing level.

According to an embodiment of the present invention, the selection of the sharing level is made after the location determination. When a request for sharing the location information is received by a party executing an application, the location is determined. Alternatively, if the previously determined location information is still valid, the location determination is not made and the location information to be transmitted to the party is obtained. The location information determined and/or obtained as above is changed into the location information corresponding to the sharing level of the party and transmitted to the party. Further, when the party requests more accurate (i.e., more detailed) location information than the received location information, the selected sharing level is changed into a higher level and the location information corresponding thereto is provided or the current status may remain, according to approval of the receiver.

According to an embodiment of the present invention, the selection of the sharing level is made before the location determination. When the request for location information is input from the application, the sharing level of the party is determined according to contact information of the party and/or status information of the receiver. In this case, the range of sharing the location information differs according to the sharing level. Once the sharing level is determined, the location determination is requested with the corresponding sharing level, and the location is determined to correspond to the sharing level to be transmitted to the party. However, in a case where the location corresponding to the sharing level cannot be determined, the location determination is made at another sharing level.

Hereinafter, it is assumed that the location determination is made after the sharing level of the location information is selected.

FIG. 1 is a block diagram of an electronic device including a touch device according to an embodiment of the present invention.

A first electronic device 101 and a second electronic device 102 have the same configuration as that of the electronic device illustrated in FIG. 1, so hereinafter, the description of the first electronic device 101 and the second electronic device 102 are substituted with the description of the electronic device illustrated in FIG. 1.

Referring to FIG. 1, the electronic device of the present invention includes a communication unit 110, a memory 120, a touch screen 130, a controller 140, a GPS receiver 150 and a sensor unit 160.

The communication unit 110 performs voice calls, video calls or data communication with external devices through networks. The communication unit 110 may include a Radio Frequency (RF) transmitter for modulating and amplifying a frequency of a signal to be transmitted, and an RF receiver for low-noise-amplifying a received signal and demodulating a frequency thereof. Further, the communication unit 110 may include a modulator and a demodulator. The modulator and the demodulator may implement a communication standard such as Code Division Multiple Access (CDMA), Wideband CDMA (WCDMA), Long Term Evolution (LTE), Wi-Fi, Wireless-Broadband (WIBRO), Bluetooth, Near Field Communication (NFC), or the like. The communication unit 110 may be a mobile communication module, an Internet communication module and/or a short-range communication module.

Particularly, the communication unit 110 according to an embodiment of the present invention receives a request for sharing the location information. The communication unit 110 receives a user's location information via a cell-ID, which is information received by a modem chip of the electronic device via a service of a base station. The communication unit 110 may adopt a short-range communication module (e.g., W-Fi, Bluetooth, or the like) and determine the location by means of techniques of triangulation or finger printing by using signals received from a Wi-Fi Access Pont (AP). Further, the communication unit 110 may receive the location information by using Bluetooth.

The memory 120 may include a program memory for storing operation programs of the electronic device and a data memory for storing data generated during execution of programs.

Particularly, the memory 120 according to an embodiment of the present invention stores party information and determined location information. Further, the memory 120 updates the stored location information into the determined location information according to an adjusted level and stores the same under the control of the controller 140.

The touch screen 130 may be integrally formed to have a display unit 131 and a touch panel 132. The display unit 131 displays various screens according to the use of the electronic device under the control of the controller 140. The display unit 131 may be made by a Liquid Crystal Display (LCD), an Organic Light Emitted Diode (OLED), an Active Matrix Organic Light Emitted Diode (AMOLED), or the like. The touch panel 132 may be a combined touch panel including a hand touch panel for detecting hand gestures and a pen touch panel for detecting pen gestures.

Particularly, in an embodiment of the present invention, the display unit 131 changes the determined location information into the location information corresponding to a party's sharing level and displays the same on a map under the control of the controller 140.

The controller 140 controls overall operations of the electronic device and signals between inner elements of the electronic device, processes data and controls power supplied from a battery to the elements.

Particularly, in an embodiment of the present invention, the controller 140 receives a request for sharing the location information from a party via the communication unit 110. When the request for sharing the location information is received, the controller 140 analyzes contact information and/or application information and determines the sharing level of the party. The controller 140 determines whether a difference value, which is calculated by comparing status information registered in an application with the current status information, is within the adjustment critical value configured in the electronic device. If the calculated difference value is within the adjustment critical value, the controller 140 adjusts the sharing level of the party and transmits the location information according to the sharing level to the party.

The GPS receiver 150 receives GPS satellite signals to obtain the current location information of the electronic device.

Particularly, the GPS receiver 150, according to an embodiment of the present invention, obtains the location information by calculating the current location coordinate (e.g., longitude, latitude and altitude) of the electronic device by using signals received from satellites.

The sensor unit 160 obtains the location information by detecting movement and the moving speed of the electronic device. The sensor unit 160 may include an acceleration sensor, a terrestrial magnetism sensor and/or a location detecting sensor.

Particularly, the sensor unit 160, according to an embodiment of the present invention, determines a change in the location of the user by using the acceleration sensor and the terrestrial magnetism sensor in a method of determining a change in location such as Pedestrian Dead Reckoning (PDR). Further, the location may be determined by measuring the magnetic field by means of a magnetometer. In addition, acoustic sensors and infrared sensors may be used for the location determination.

Furthermore, the electronic device may selectively include a camera module for photographing still images and moving images, an audio processing unit including a microphone and a speaker, a broadcast receiving module for receiving broadcasting signals, and an input unit for supporting inputs based on hard keys, where the detailed description and illustration thereof is omitted.

Figure 2:
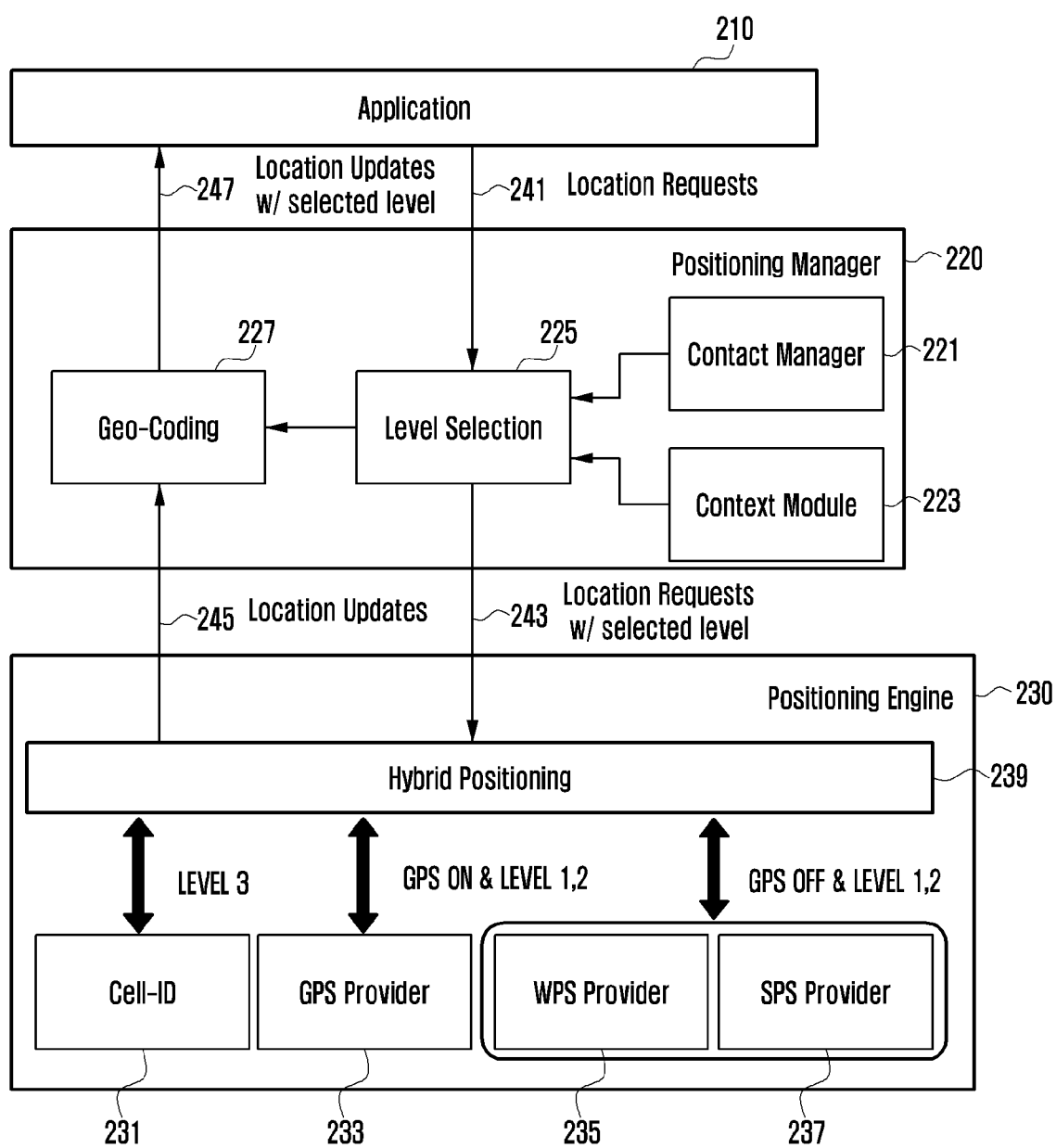
FIG. 2 is a block diagram of an electronic device for generating, selecting and outputting location information according to an embodiment of the present invention.

FIG. 2 is a block diagram of an electronic device for generating, selecting and outputting location information according to an embodiment of the present invention.

Referring to FIG. 2, the electronic device includes a positioning manager 220 and a positioning engine 230. The positioning manager 220 includes a contact manager 221, a context module 223, a level selection unit 225 and a geocoding unit 227. Further, the positioning engine 230 includes a cell-ID extracting unit 231, a GPS provider 233, a WPS provider 235, a SPS provider 237 and a hybrid positioning unit 239. Furthermore, the electronic device may include a location DataBase (DB) (not shown).

The request 241 for sharing the location information is transmitted to the level selection unit 225 by executing an application 210. The level selection unit 225 determines the sharing level by analyzing the contact manager 221 and the context module 223.

In this case, the contact manager 221 includes a contact ID, a minimum (MIN) level and a maximum (MAX) level as shown in Table 1 below, which is information on the party who the location information will be shared with. The contact ID refers to a party's ID. The minimum level means the minimum range of the location information that may be shared with the party (i.e., the lowest numbered level showing the most accurate detail of a narrowest range), and the maximum level means the maximum range of the location information that may be shared with the party (i.e., the highest numbered level showing the least accurate detail of a widest range). The minimum level and the maximum level may be configured in the application 210 or the contact manager 221. As described above, based on the sharing level of the location information with respect to the user, the location information corresponding to the sharing level may be shared. In addition, in the case of the user whose level is not configured, the location information may be shared at a default level. In this case, the default level may vary by party. Alternatively, the sharing level of the location information may be configured for each group. In this case, a group may include a family, friends, co-workers, clubs and a group defined by the user.

TABLE 1

| Contact ID | Min | Max |
|---|---|---|
| James | LV1 | LV3 |
| Tony | LV1 | LV4 |
| Father | LV1 | LV2 |
| . | . | . |
| . | . | . |
| . | . | . |

When the sharing level is determined, the determined level is transmitted 243 to the positioning engine 230 to request the location determination according the level. The positioning engine 230 includes a GPS provider 233 for determining the location by using GPS information from the GPS receiver 150, a Wi-Fi Positioning System (WPS) provider 235 for determining the location via triangulation by receiving Wi-Fi signals, a Sensor Positioning System (SPS) provider 237 for determining the location by analyzing the outputs of the sensor unit 160, and a cell-ID extracting unit 231 for extracting information (i.e., cell-IDs) of a base station received via the communication unit 110. The positioning engine 230 transmits the determined location information 245 to the geo-coding unit 227 of the positioning manager 220 via the hybrid positioning unit 239. The geo-coding unit 227 changes the determined location information into regional information or address information corresponding to the level and transmits 247 the same to the application 210. For example, a geographical coordinate may be transmitted at sharing level one, and zone information may be transmitted at sharing level two. Further, at sharing level three, the location information based on the cell-ID may be transmitted.

Figure 3:
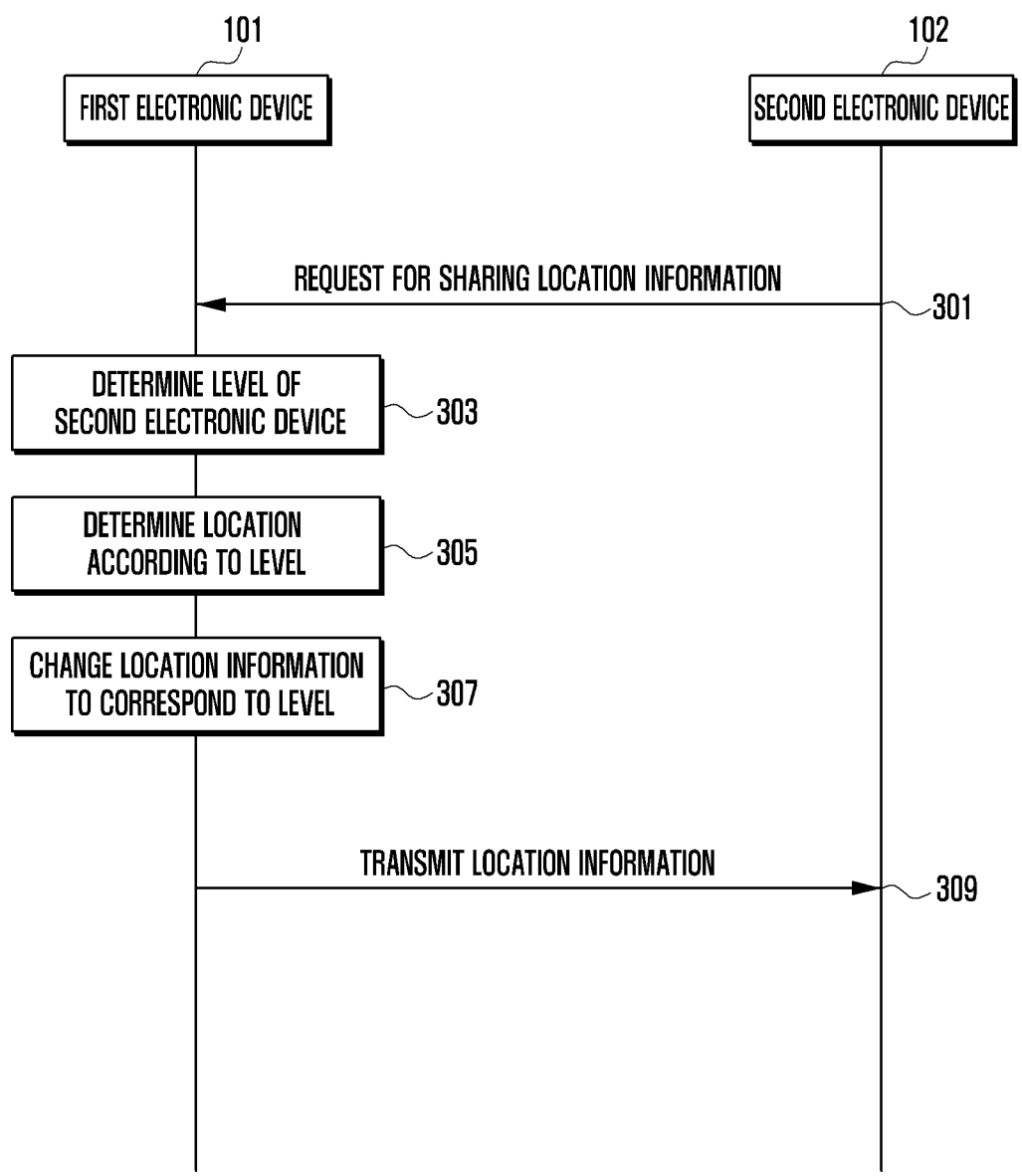
FIG. 3 is a flow diagram illustrating signal flows for sharing location information between a first electronic device and a second electronic device according to an embodiment of the present invention.

FIG. 3 is a flow diagram illustrating signal flows for sharing location information between the first electronic device 101 and the second electronic device 102 according to an embodiment of the present invention.

Referring to FIG. 3, the first electronic device 101 receives a request for sharing the location information from the second electronic device 102 in step 301. The first electronic device 101 determines the level of the second electronic device 102 in step 303. The level is determined by analyzing the party's level registered in the contact information and status information registered in the application (e.g., a schedule application, a memo application, a contact application, or the like). Specifically, the sharing level information of the second electronic device 102 is registered in the contact information, and the sharing level is determined based on the contact information. In addition, in the case of the executed application providing the location information, if the application includes the sharing level of the second electronic device 102, the sharing level is determined based on the sharing level information of the application. In this case, the request for sharing the location information is received from the user who is not registered in the application, the location information is shared at the default level that is configured with respect to all users in the electronic device 101, or the location information may not be shared. In addition, based on the information registered in the application, when the information, e.g., time information and/or location information, exceeds the adjustment critical value that is pre-registered in the electronic device 101, the location information is configured not to be shared even with the request for sharing the location information.

Subsequently, the first electronic device 101 determines the location by using the determined sharing level in step 305. Specifically, if the determined sharing level is level one and/or level two, the location determination is performed by using the GPS, the WPS and the SPS. And, when the determined sharing level is level three, the cell-ID received from the base station via the communication unit 110 is extracted. In step 307, the first electronic device 101 changes the determined location information into the location information corresponding to the sharing level. Then, mapping information corresponding to the sharing level is provided. In this case, the determined location information is changed into the location information corresponding to the sharing level by using the mapping information. The first electronic device 101 transmits the changed location information to the second electronic device 102 in step 309. Specifically, the geographical coordinate is transmitted at level one, and the determined location information is changed into zone information to be thereby transmitted at level two. And, at level three, the location information based on the cell-ID is transmitted.

Figure 4:
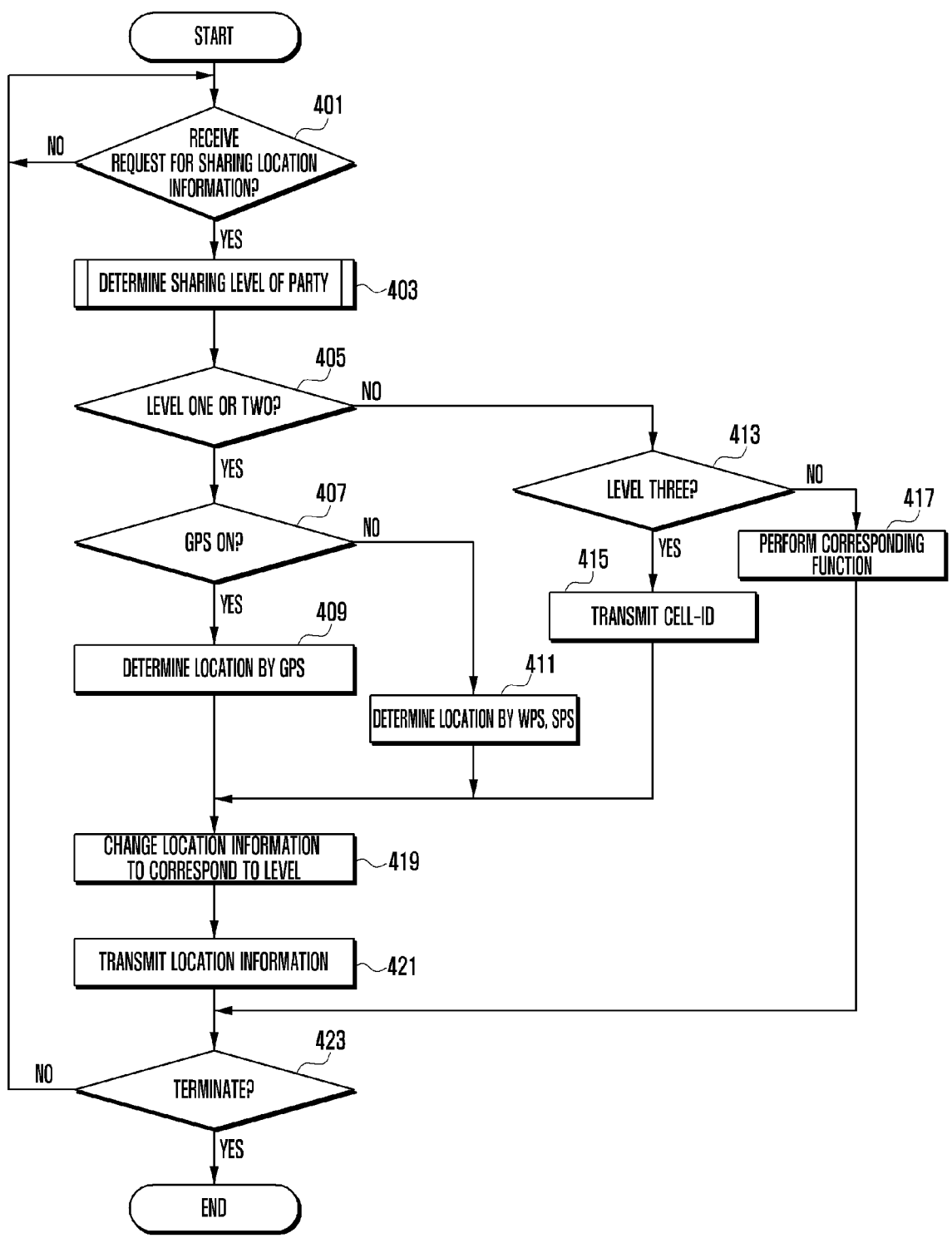
FIG. 4 is a flowchart illustrating a method of sharing location information according to an embodiment of the present invention.

FIG. 4 is a flowchart illustrating a method of sharing location information according to an embodiment of the present invention.

Referring to FIG. 4, the controller 140 receives a request for sharing location information from a party via the communication unit 110 in step 401. The request for sharing the location information may be made via an application, and the application may include applications of a schedule, a memo, a message, an e-mail, an SNS and an instant messenger. When the request for sharing the location information is received, the controller 140 determines the sharing level of the party on the basis of the contact information and/or the application information in step 403. Here, the sharing level may be the minimum level or the maximum level. The minimum level means that the minimum range of the location information is shared with the party, and the maximum level means that the maximum range of the location information is shared with the party. At least one of the minimum level and the maximum level is configured as a default level. That is, the level configured as a default may differ depending on the party. The sharing level has four levels in an embodiment of the present invention, but the present invention is not limited thereto. Specifically, level one is the most accurate location information level, and level two is the location information of a zone level. Further, level three is the location information level based on the cell-IDs and the location information is not shared at level four. In addition, the sharing level of the party may be configured by the application or the contact manager.

Step 403 of FIG. 4 is described below with reference to FIG. 5.

Figure 5:
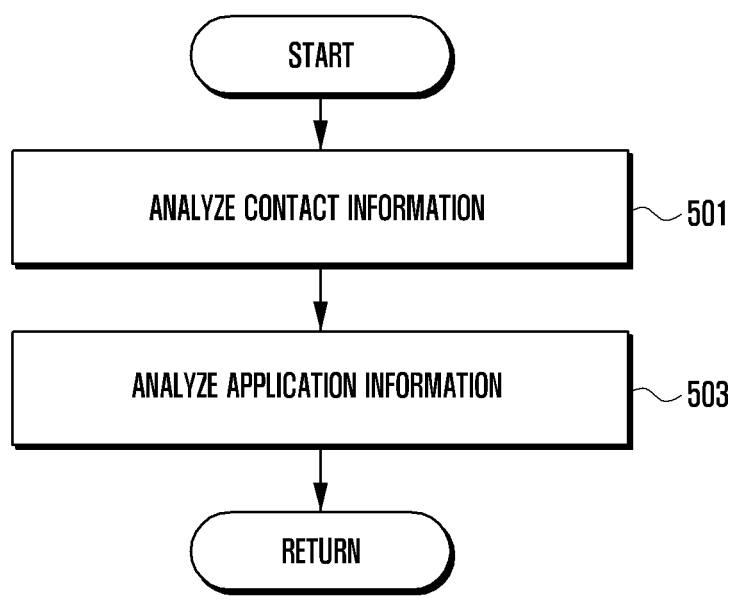
FIG. 5 is a flowchart illustrating a method of determining a sharing level according to an embodiment of the present invention.

FIG. 5 is a flowchart illustrating a method of determining a sharing level according to an embodiment of the present invention.

Referring to FIG. 5, the controller 140 analyzes contact information of a party, which is registered in the memory 120 in step 501. With the analysis of the contact information, the controller 140 determines whether the sharing level information of the party is registered in the contact information. If the sharing level information of the party is registered in the contact information, the controller 140 determines the sharing level of the party based on the sharing level registered in the contact information. In addition, the controller 140 analyzes information of the application that has requested the location information, in step 503. In the case of the application providing the location information, if the application includes the sharing level of the party, the controller 140 may determine the sharing level based on the sharing level information of the corresponding application. In contrast, if the sharing level information of the party is not registered in the contact information and the application information, the controller 140 determines the sharing level by the default level to share the location information, or the controller 140 determines the sharing level to be the level (e.g., level four) at which the location information may not be shared. Then, the sharing level is adjusted by status information registered in the application. The status information registered in the application may include time information and/or location information, and situations of driving, working, meeting and personal works may be considered as the status information. In addition, the controller 140 may compare the status information (e.g., time information or location information) registered in the application with the current status information (e.g., the current time or the current location). The sharing level of the party is adjusted depending on whether the difference value (e.g., a time difference value or a location difference value) calculated by comparing as above is within the adjustment critical value configured in the electronic device. For example, in a case where the adjustment critical value is configured as thirty minutes before the appointed time, the controller 140 updates and transmits the location information thirty minutes before the appointed time. Alternatively, when it is detected that the location movement is within the adjustment critical value, the controller 140 updates and transmits the location information.

Returning to FIG. 4, the controller 140 determines whether the determined sharing level is level one or level two in step 405. The controller 140 determines the location by using the location determination sensor corresponding to the sharing level. That is, the location may be determined via the GPS provider 233 by using GPS information output from the GPS receiver 150, or the location may be determined with the techniques of triangulation or finger printing via the Wi-Fi positioning system (WPS) provider 235 by receiving Wi-Fi signals. Further, the location may be determined via the SPS provider 237 by analyzing the output of the sensor unit 160, or the cell-ID extracting unit 213 for extracting base station information (e.g., cell-IDs) received via the communication unit 110 may be used for the location determination. In an embodiment of the present invention, the location is determined via the GPS provider 233, the WPS provider 235 and the SPS provider 237 at level one or level two, and the location information is obtained via the cell-ID 231 at level three.

If the determined level is level one or level two, the controller 140 detects the same in step 405, and determines whether the GPS is in the "ON" state in step 407. If the GPS is in the "ON" state, the controller 140 determines the location via the GPS provider 233 in step 409. In contrast, if the GPS is not in the "ON" state, the controller 140 determines the location by using the WPS provider 235 and/or the SPS provider 237 in step 411.

Meanwhile, if the sharing level is determined not to be level one or level two in step 405, the controller 140 determines whether the determined level is level three in step 413. If the sharing level is determined to be level three, the controller 140 extracts and transmits a cell-ID value via the communication unit 110 in step 415. Alternatively, if the sharing level is determined not to be level three, the controller 140 performs a corresponding function in step 417. For example, the location information may not be shared or predetermined location information may be shared. Here, predetermined location information may be different from the current location information of the first electronic device 101.

Next, the controller 140 changes the determined location information (i.e., the location information determined in steps 409, 411 and 415) into the location information corresponding to the level in step 419, and transmits the changed location information to the party in step 421. Specifically, when the party's level is level one, the controller 140 directly transmits the geographical coordinate (i.e., longitude, latitude and altitude) to the party without changing the location information. Alternatively, when the party's level is level two, the controller 140 changes the determined location information into regional information (e.g., the zone/area) corresponding to the geographical coordinate included in the received location information, and transmits the same to the party. For example, if the coordinate value of the determined location information is (37.49760569477413, 127.02718734741211), the location information determined as a zone of Gangnam Station in Seoul, Korea, where the coordinate is included is changed into the regional information. Further, when the party's level is level three, the controller 140 changes the determined location information into regional information including the cell-ID based on the cell-ID and transmits the same to the party.

After the location information is transmitted, the controller 140 determines whether an instruction of termination is detected in step 423. When the instruction of termination is detected, the controller 140 terminates the location determination. In contrast, when the instruction of termination is not detected, the controller 140 returns to step 401 to repeat steps 401 to 421.

Figure 6:
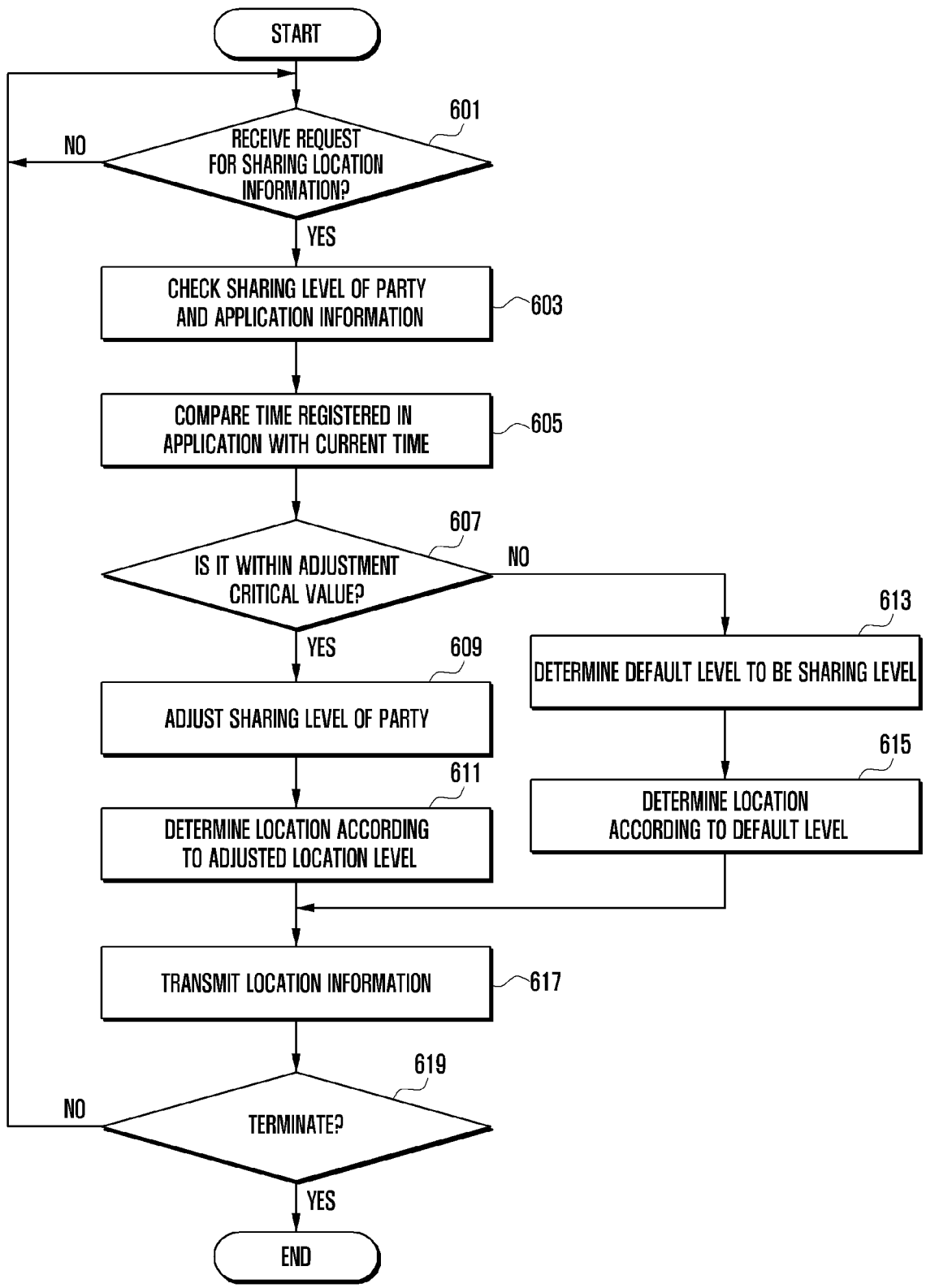
FIG. 6 is a flowchart illustrating a method of adjusting a sharing level of location information according to time information, according to an embodiment of the present invention.

FIG. 6 is a flowchart illustrating a method of adjusting a sharing level of location information according to time information, according to an embodiment of the present invention.

Referring to FIG. 6, the controller 140 receives the request for sharing the location information from a party via the communication unit 110 in step 601. When the request for sharing the location information is received, the controller 140 determines the sharing level of the party by analyzing contact information and application information in step 603. In this case, the sharing level of the party is checked via contact information. The sharing level includes the minimum level and the maximum level, and at least one of the minimum level and the maximum level is configured as a default level value. Further, the information may be time information or location information, which is registered in applications of a schedule, a memo, a message, an e-mail, an SNS and an instant messenger.

When the request for sharing the location information is received, the controller 140 determines whether the sharing level information of the party is registered in the contact information. If the sharing level information of the party is registered in the contact information, the controller 140 determines the sharing level of the party, based on the sharing level registered in the contact information. In addition, the controller 140 analyzes information of the application that has requested the location information. In the case of the application providing the location information, if the application includes the sharing level of the party, the controller 140 determines the sharing level, based on the sharing level information of the corresponding application. In contrast, if the sharing level information of the party is not registered in the contact information and the applications, the controller 140 determines the sharing level to be a default level to share the location information, or the controller 140 determines the sharing level to be the level (e.g., level four) at which the location information may not be shared.

Subsequently, the controller 140 compares the time registered in the application with the current time in step 605. In this case, the controller 140 compares a time difference value, which is calculated by the above comparison, with the adjustment critical value configured in the electronic device. With the comparison, the controller 140 determines whether the time difference value is within the adjustment critical value in step 607. If the time difference value is not within the adjustment critical value, the controller 140 determines the sharing level by the default level in step 613. In addition, the controller 140 determines the location corresponding to the default level in step 615.

In contrast, if the time difference value is within the adjustment critical value, the controller 140 adjusts the sharing level of the party in step 609. In this case, the adjusted level is one of the minimum level or the maximum level, which is not configured as a default. That is, when the minimum level is configured to be the default level value, the adjusted value is the maximum level value, and when the maximum level is configured to be the default level value, the adjusted value is the minimum level value.

Next, the controller 140 determines the location corresponding to the adjusted level in step 611. The controller 140 changes the determined location information into the location information (e.g., the geographical coordinate or the zone/area) corresponding to the level and transmits the same to the party in step 617. In this case, if the time registered in the application expires, even with the request for sharing the location information, the controller 140 will not share the location information.

The controller 140 determines whether an instruction of termination is detected in step 619. When the instruction of termination is detected, the controller 140 terminates the operation of sharing the location determination. In contrast, when the instruction of termination is not detected, the controller 140 returns to step 601 to repeat steps 601 to 617.

Figure 7A:
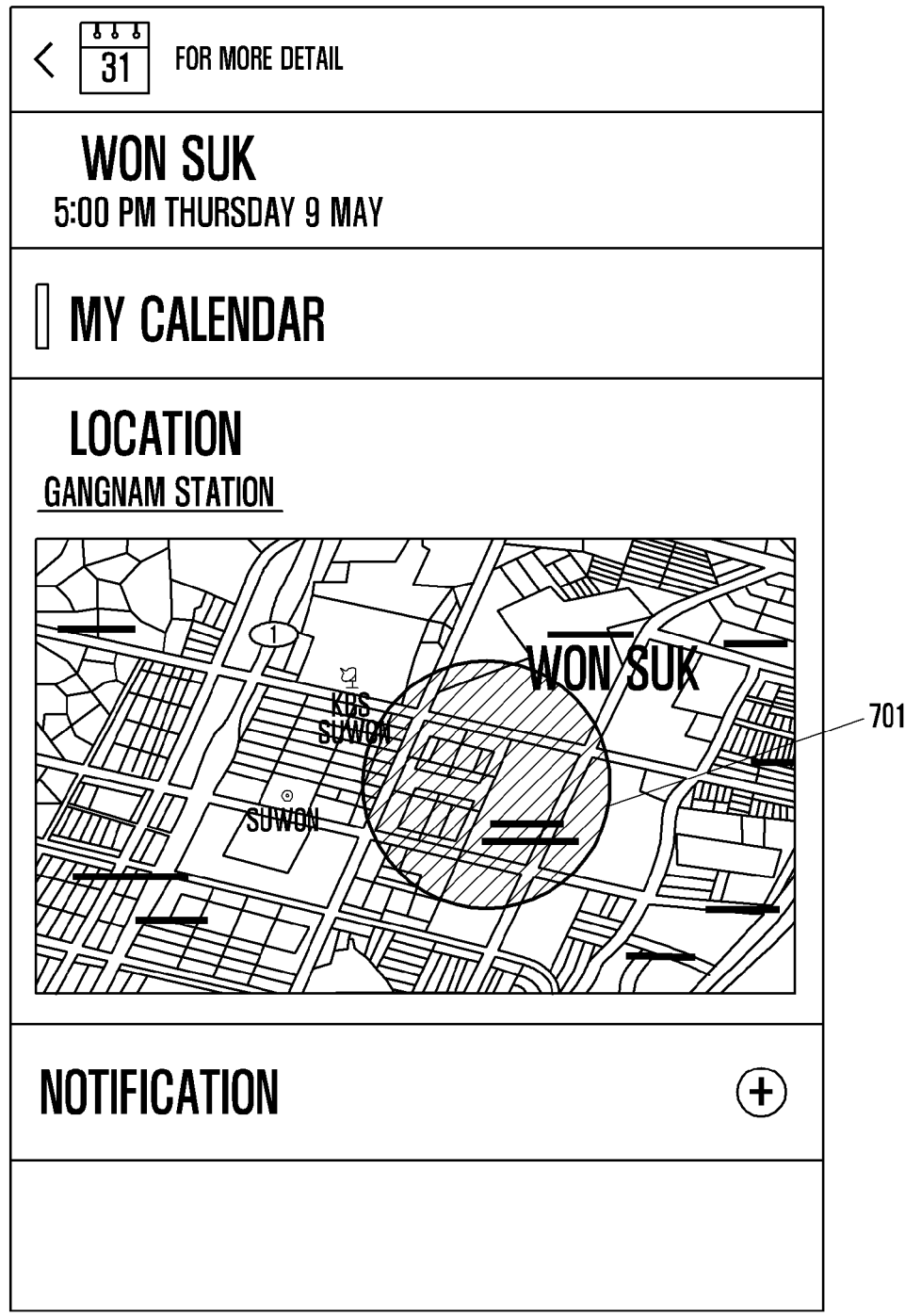
FIGS. 7A and 7B are diagrams illustrating a method of adjusting a sharing level of location information according to time information, according to an embodiment of the present invention.
Figure 7B:
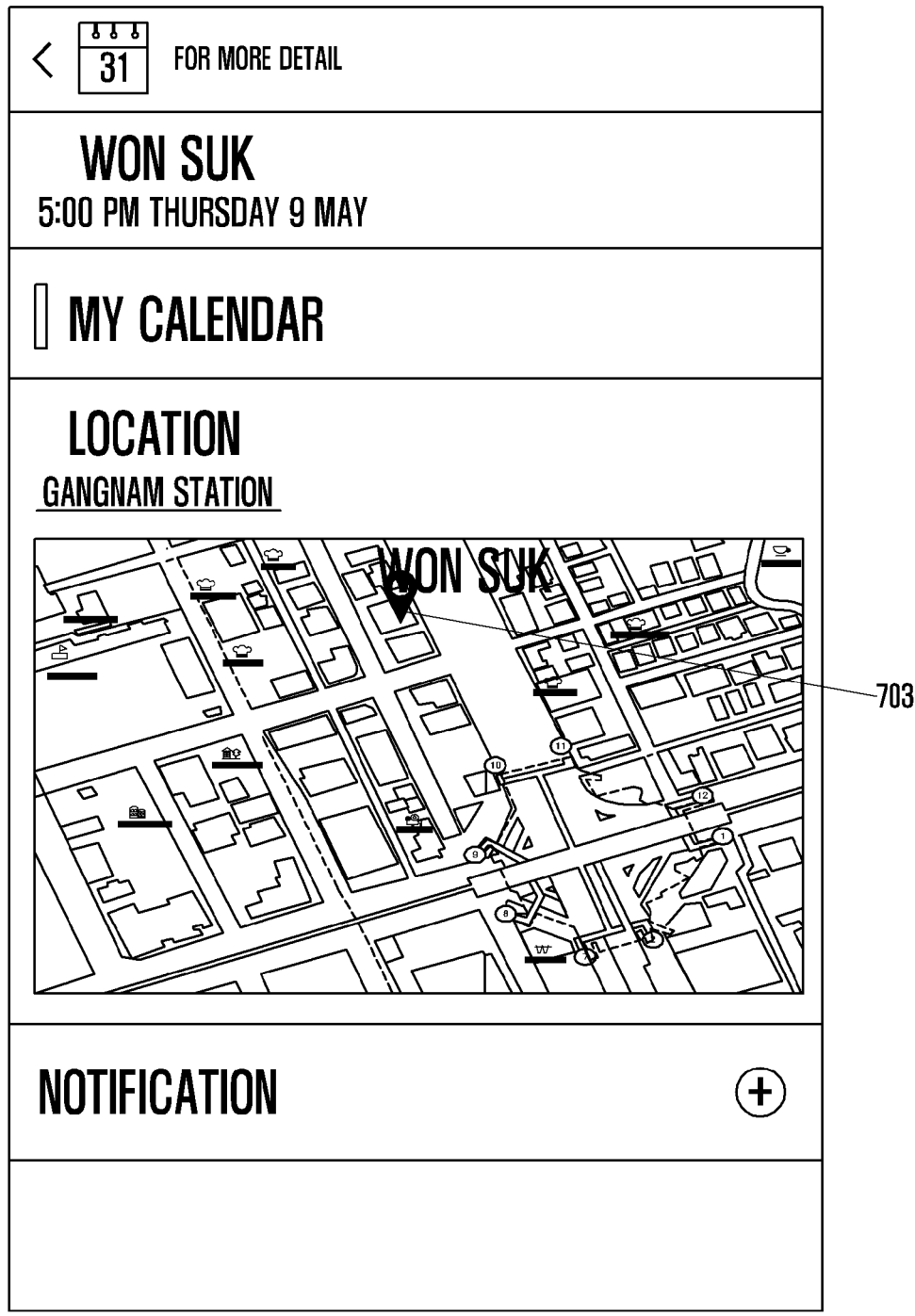

FIGS. 7A and 7B are diagrams illustrating a method of adjusting a location information sharing level according to time information according to an embodiment of the present invention.

FIGS. 7A and 7B show that when a request for sharing location information is received from a person who is registered to have an appointment in the schedule application, the current time is compared with the time registered in the schedule and if the time difference value is within a user-defined range, the level is adjusted.

Referring to FIGS. 7A and 7B, it is assumed that an appointment with James in Gangnam Station at 5:00 pm is registered in the schedule application, and James' sharing level is configured to be level one as the minimum level, level three as the maximum level and level three as a default level. Also, the sharing level of the location information is adjusted at 30 minutes before the time registered in the schedule.

The user receives a request for sharing the location information from James at 4:00 pm. Since the sharing level is adjusted at 30 minutes before the appointed time as assumed above, in the case of receiving the request for sharing the location information at 4:00 pm, that is, one hour before the appointed time, the sharing level is not adjusted and the default level is determined as the sharing level. That is, James' level is level three that is configured as a default, and the location is determined by using a location sensor corresponding to level three. At level three, the location information is received by using the cell-ID, changed into the address information corresponding to level three by using the cell-ID, and is transmitted to James. The location information based on the cell-ID is displayed in the wide range 701 on the map provided by the schedule application, as shown in FIG. 7A.

Next, when the user receives the request for sharing the location information from James at 4:30 pm, that is, 30 minutes before the appointed time, the sharing level is adjusted. With the adjustment of the sharing level, James' sharing level is changed from level three, that is the default level, to level one. When James' sharing level is changed from level three to level one, the location is determined by using the GPS provider 233 and/or the WPS provider 235 and/or the SPS provider 237, and a geographical coordinate, which is the determined location information, is transmitted to James. The transmitted geographical coordinate is accurately displayed by a dot 703 on the map provided by the schedule application, as shown in FIG. 7B. In addition, when the request for sharing the location information is received from James after 5:00 pm, i.e., after the appointed time, the user does not share the location information with James.

As described above, the wide range of the location information is usually shared. However, as the appointed time approaches, the sharing level of the location information may be dynamically changed so that the more accurate location information may be shared.

Figure 8:
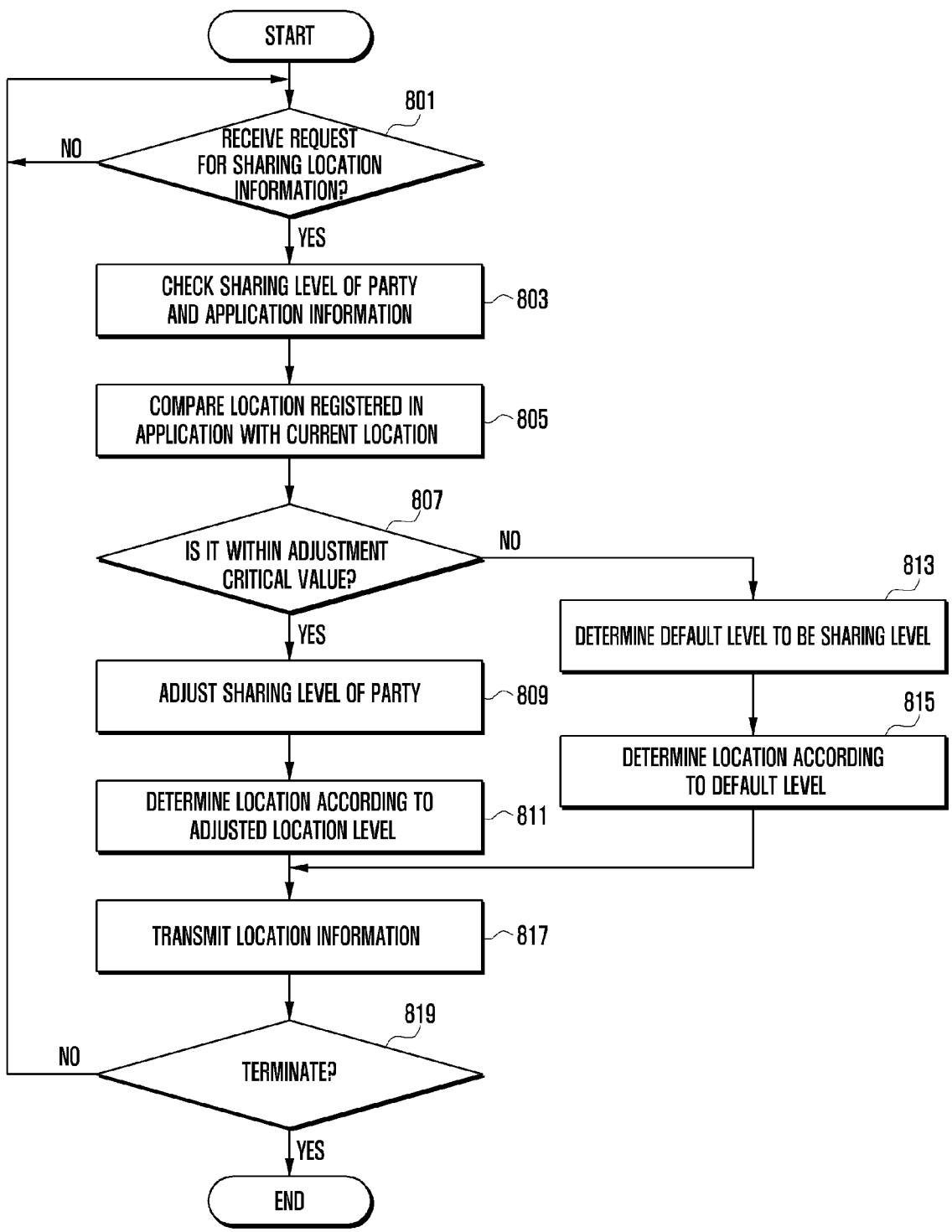
FIG. 8 is a flowchart illustrating a method of adjusting a sharing level of location information according to location information, according to an embodiment of the present invention.

FIG. 8 is a flowchart illustrating a method of adjusting a sharing level of location information according to location information, according to an embodiment of the present invention.

Referring to FIG. 8, the controller 140 receives a request for sharing location information from a party via the communication unit 110 in step 801. When the request for sharing the location information is received, the controller 140 determines the sharing level of the party by analyzing contact information and application information in step 803. In this case, the sharing level of the party is checked via the contact information. The sharing level includes the minimum level and the maximum level, and at least one of the minimum level and the maximum level is configured as the default level. Further, the information may be time information or location information, which is registered in applications of a schedule, a memo, a message, an e-mail, an SNS and an instant messenger.

When the request for sharing the location information is received, the controller 140 determines whether the sharing level information of the party is registered in the contact information. If the sharing level information of the party is registered in the contact information, the controller 140 determines the sharing level of the party, based on the sharing level registered in the contact information. In addition, the controller 140 analyzes information of the application that has requested the location information. In the case of the application providing the location information, if the application includes the sharing level of the party, the controller 140 determines the sharing level, based on the sharing level information of the corresponding application. In contrast, if the sharing level information of the party is not registered in the contact information and the application, the controller 140 determines the sharing level as the default level to share the location information, or the controller 140 determines the sharing level to be a level (e.g., level four) at which the location information is not shared.

Subsequently, the controller 140 compares the location registered in the application with the current location in step 805. In this case, the controller 140 compares the location difference value, which is calculated by the comparison, with the adjustment critical value configured in the electronic device. With the comparison, the controller 140 determines whether the location difference value is within the adjustment critical value in step 807. If the location difference value is not within the adjustment critical value, the controller 140 determines the default level to be the sharing level in step 813, and determines the location corresponding to the default level in step 815.

In contrast, if the location difference value is within the adjustment critical value, the controller 140 adjusts the sharing level of the party in step 809. In this case, the adjusted level is one of the minimum level or the maximum level, which is not configured as a default. That is, when the minimum level is configured as the default level, the adjusted value is the maximum level, and when the maximum level is configured as the default level, the adjusted value is the minimum level.

Next, the controller 140 determines the location by using a location determination sensor corresponding to the adjusted level in step 811. The controller 140 changes the determined location information into the location information (e.g., the geographical coordinate or the zone/area) corresponding to the level and transmits the same to the party in step 817.

The controller 140 determines whether an instruction of termination is detected in step 819. When the instruction of termination is detected, the controller 140 terminates the operation of sharing the location determination. In contrast, when the instruction of termination is not detected, the controller 140 returns to step 801 to repeat steps 801 to 817.

Figure 9A:
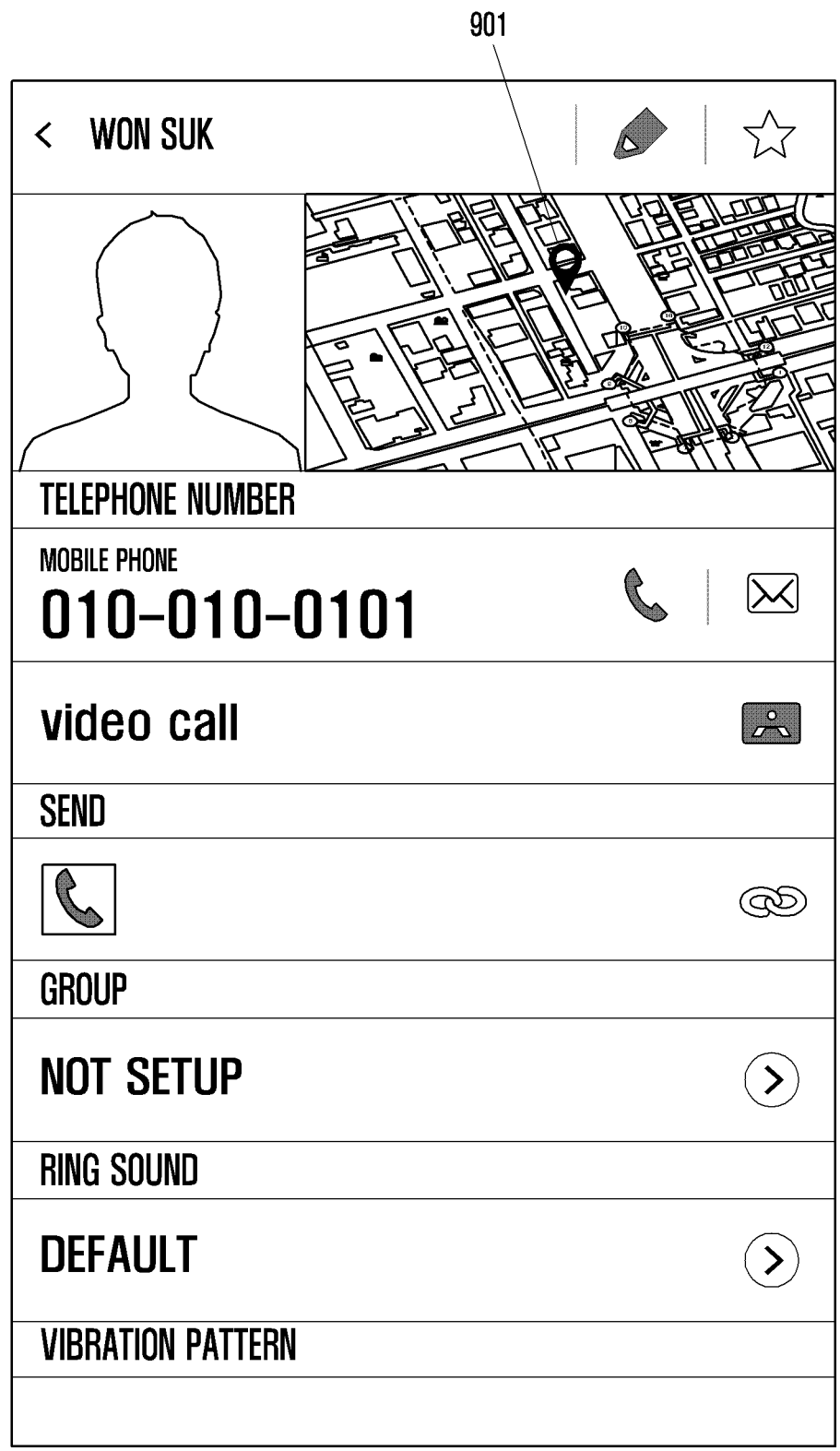
FIGS. 9A and 9B are diagrams illustrating a method of adjusting a sharing level of location information according to location information, according to an embodiment of the present invention.
Figure 9B:

FIGS. 9A and 9B are diagrams illustrating a method of adjusting a sharing level of location information according to location information, according to an embodiment of the present invention.

FIGS. 9A and 9B show that when a request for sharing location information is received from a person who is registered in contact information, the current location is compared with the preregistered location and, if the difference value is within a range, the level is adjusted.

Referring to FIGS. 9A and 9B, it is assumed that a father's sharing level is configured to be level one as the minimum level, level two as the maximum level and level one as a default level, where the location is shared at level two in his office (i.e., the location of the adjustment critical value is configured as a office).

The user receives a request for sharing the location information from the father, and the current location is not the office. Since the current location of the user is not the office, the sharing level is not adjusted, and the father's sharing level is configured as the default level. That is, level one is selected, and the geographical coordinate determined by using the GPS provider 233 and/or the WPS provider 235 and/or the SPS provider 237 is transmitted to the father. The geographical coordinate transmitted to the father is displayed by a dot 901 on the map provided in the contact application as shown in FIG. 9A.

Later, the user is in the office and receives a request for sharing the location information from the father. Since the user is in the office, the sharing level is adjusted. Specifically, if the location difference value, which is calculated by comparing the current location with the location (i.e., the office) registered as the adjustment critical value, is within the adjustment critical value, the sharing level is adjusted. In contrast, if the location difference value exceeds the adjustment critical value, the sharing level is be adjusted. That is, the father's sharing level of the location information is adjusted to be level two. The location corresponding to level two is determined and changed into the zone/area location information corresponding to level two and transmitted to the party. The location information transmitted to the father is displayed in the wide range in the form of a section or a zone 903 including a coordinate on the map provided by the contact application, as shown in FIG. 9B.

While very accurate location information may be shared with intimate ones, such as a family, a user in his/her office does not need to share accurate location information. So, the sharing level may be dynamically changed into the level that shows only that the user is in the office, for sharing the location information.

Figure 10:
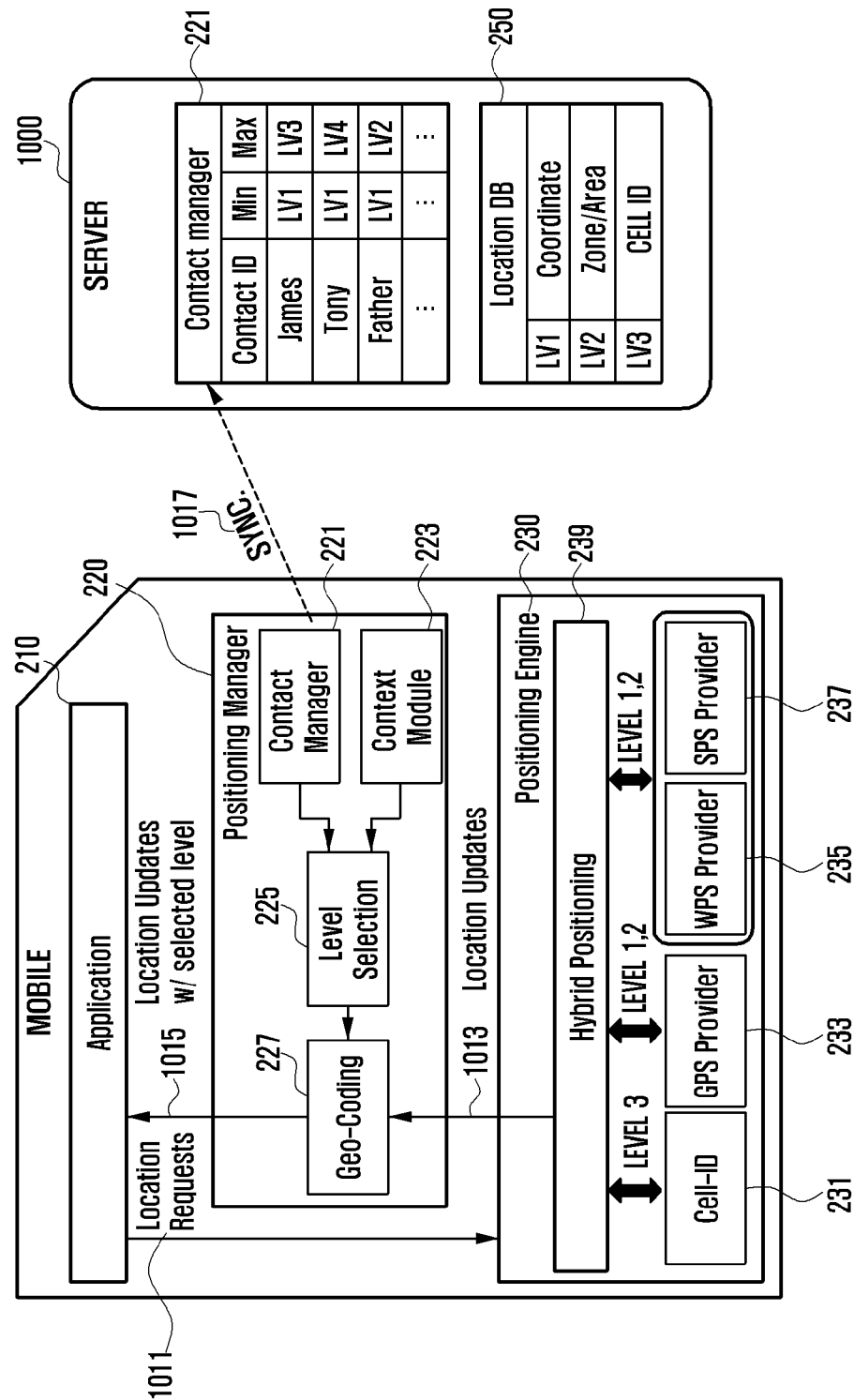
FIG. 10 is a block diagram of an electronic device and a server for generating, selecting and outputting location information according to an embodiment of the present invention.

FIG. 10 is a block diagram of an electronic device and a server for generating, selecting and outputting location information according to an embodiment of the present invention.

Referring to FIG. 10, the electronic device includes a positioning manager 220 and a positioning engine 230. The positioning manager 220 includes a contact manager 221, a context module 223, a level selection unit 225 and a geocoding unit 227. Further, the positioning engine 230 includes a cell-ID extracting unit 231, a GPS provider 233, a WPS provider 235, an SPS provider 237 and a hybrid positioning unit 239. Furthermore, the electronic device may include a location DataBase (DB) (not shown). In addition, the server 1000 includes a contact manager 221 and a location DB 250, as the same as the electronic device.

A request 1011 for sharing the location information is transmitted to the positioning engine 230 by executing application 210. The positioning engine 230 includes a GPS provider 233 for determining the location by using GPS information output from the GPS receiver 150, a Wi-Fi positioning system (WPS) provider 235 for determining the location via triangulation by receiving Wi-Fi signals, a SPS provider 237 for determining the location by analyzing the outputs of the sensor unit 160, and a cell-ID extracting unit 231 for extracting the information (i.e., cell-IDs) of the base station received via the communication unit 110. The positioning engine 230 combines the determined location information 1013 via the hybrid positioning unit 239 and transmits the same to the positioning manager 220. The positioning manager 220 determines the level of the party in the level selection unit 225 by analyzing the contact manager 221 and/or the context module 223. In this case, the contact manager 221 includes a contact ID, the minimum level and the maximum level, which are information about the party who the location information will be shared with. The contact ID refers to a party's ID. The minimum level means that the minimum range of the location information is shared with the party, and the maximum level means that the maximum range of the location information is shared with the party. The minimum level and the maximum level may be configured in the applications 210 or the contact manager 221. In addition, in the case of the party whose level is not configured, the location information is shared by the default level. In this case, the default level may vary by party. Alternatively, the sharing level of the location information may be configured by each group. In this case, the group may include a family, friends, co-workers, clubs and a group defined by the user.

In addition, the server 1000 includes a contact manager 221 and a context module 223, which are synchronized 1017 with the contact manager 221 and the context module 223 of the electronic device. The geo-coding unit 227 changes the location information 1015 received from the positioning engine 230 into regional information or address information corresponding to the level and transmits the same to the application 210.

Figure 11:
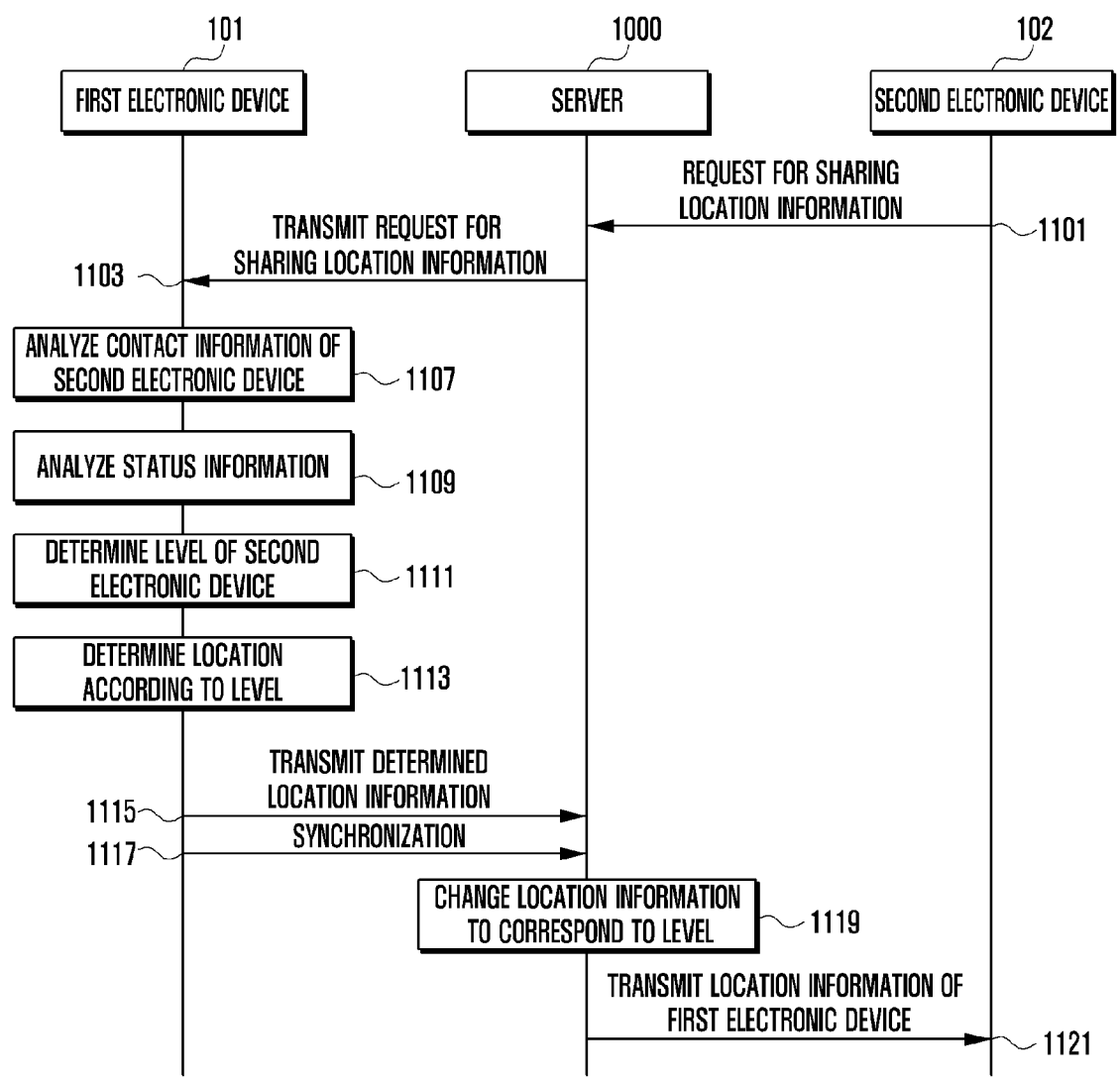
FIG. 11 is a flow diagram illustrating signal flows for sharing location information between an electronic device and a server according to an embodiment of the present invention.

FIG. 11 is a flow diagram illustrating signal flows for sharing location information between an electronic device and a server according to an embodiment of the present invention.

Referring to FIG. 11, the second electronic device 102 makes a request to the server 1000 for sharing location information of the first electronic device 101 in step 1101. The server 1000 transmits the request for sharing the location information to the first electronic device 101 in step 1103. Next, the first electronic device 101 analyzes the contact information of the second electronic device 102 in step 1107, and analyzes status information in step 1109.

With the analysis of the contact information and the status information, the first electronic device 101 determines the sharing level of the second electronic device 102 in step 1111, and determines the location according to the level in step 1113. In addition, the first electronic device 101 transmits the determined location information to the server 1000 in step 1115. The first electronic device 101 is synchronized with the server 1000 in step 1117. With the synchronization, the level information and location information of the first electronic device 101 and the server 1000 are updated. Next, the server 1000 changes the determined location information to correspond to the sharing level of the second electronic device 102 in step 1119. In this case, the server 1000 includes the location DB 250 according to the sharing level. The determined location information is changed into the location information (e.g., coordinate, zone information or base station information) that is paired with the level by using the location DB 250. Then, if the location DB 250 is not included in the first electronic device 101 but is included in the server 1000, the first electronic device 101 transmits the selected level with the cell-ID or the geographical coordinate to the server 1000, and the server 1000 changes the cell-ID or the geographical coordinate into the location information corresponding to the selected level. The server 1000 transmits the changed location information to the second electronic device 102 in step 1121.

Figure 12:
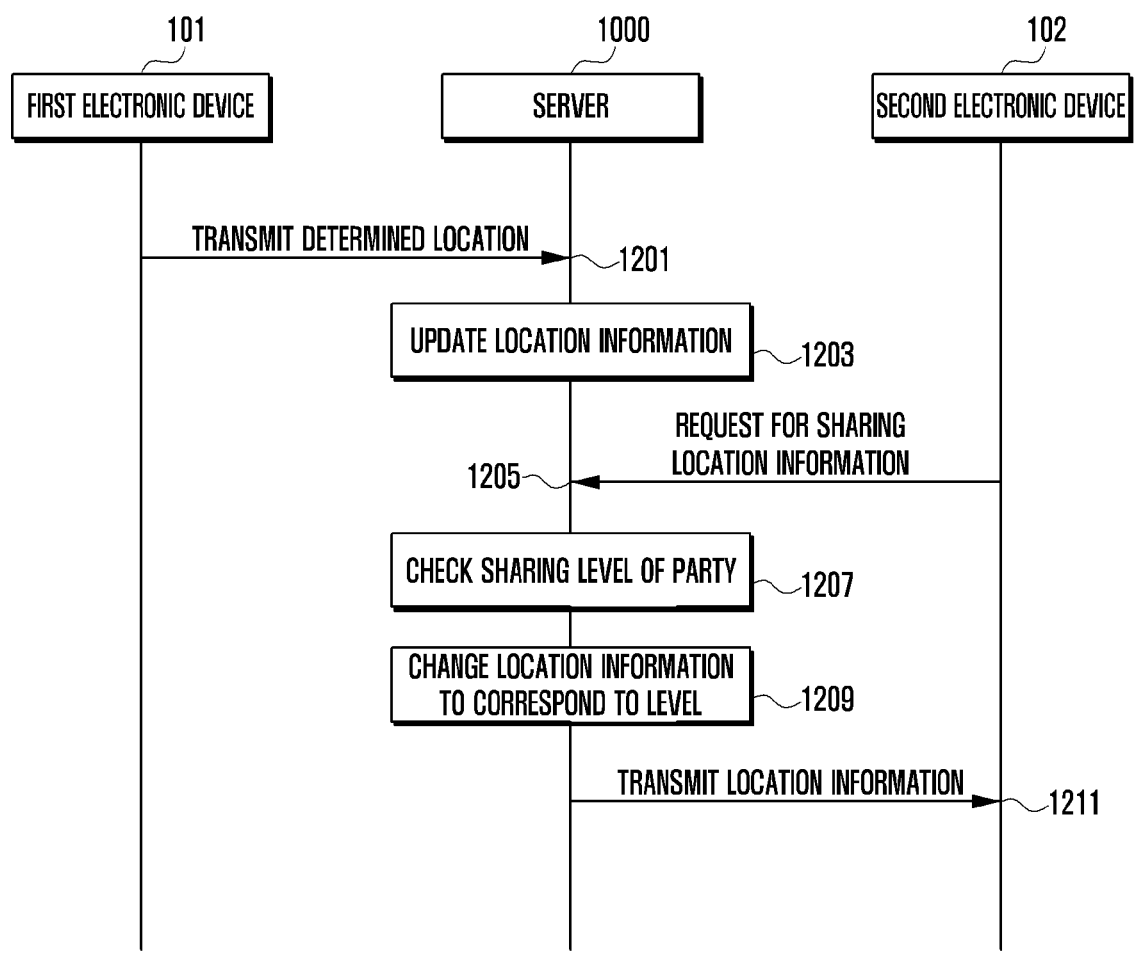
FIG. 12 is a flow diagram illustrating a method of sharing location information via a server according to an embodiment of the present invention.

FIG. 12 is a flow diagram illustrating a method for sharing location information through a server according to an embodiment of the present invention.

FIG. 12 shows that the first electronic device 101 periodically transmits location information thereof to the server 1000, and the server 1000 processes a request for sharing the location information from the second electronic device 102.

Referring to FIG. 12, the server 1000 receives the determined location information from the first electronic device 101 in step 1201. In step 1203, the server 1000 updates the old location information stored therein with the recent location information that is received. The above steps 1201 and 1203 may be repeated until the request for sharing the location information is received from the second electronic device 102. Subsequently, the server 1000 receives a request for sharing the location information from the second electronic device 102 in step 1205. When the request for sharing the location information is received, the server 1000 checks the sharing level of the second electronic device 102 in step 1207, and changes the location information according to the level in step 1209. The server 1000 transmits the changed location information to the second electronic device 102 in step 1211. After that, the server 1000 returns to step 1201 to repeat the steps of receiving the determined location information from the first electronic device 101 and updating the location information.

For example, it is assumed that the electronic device may periodically transmit the determined location information to the server 1000 and James' location sharing level is configured to be level one as the minimum level, level three as the maximum level and level three as a default level. Further, when the request for sharing the location information is received from James, the server 1000 shares the location information with James according to James' default level. The electronic device periodically determines the location and transmits the determined location information (e.g., the cell-ID or the geographical coordinate) to the server 1000. Then, the request for sharing the location information is received from James. In this case, the server 1000 does not transmit the request for sharing the location information to the electronic device and processes the same therein. Since the contact manager in the server 1000 is synchronized with the contact manager in the electronic device, the contact manager in the server 1000 has the same information as that of the contact manager in the electronic device. Specifically, since James' sharing level is configured to be level one as the minimum level and level three as the maximum level in the contact manager in the electronic device, the contact manager of the server also stores James' sharing level to be level one as the minimum level and level three as the maximum level. That is, when the request for sharing the location information is received from James, the location information is changed into the location information that is paired with James' level configured as a default by using the location DB 250, to be thereby transmitted to James.

While the method and apparatus for sharing location information of an electronic device has been described above in connection with the embodiments of the present invention and the drawings, these embodiments are provided merely to readily describe and to facilitate understanding of the present invention, and are not intended to limit the scope of the present invention. Therefore, it should be construed that all modifications or modified forms drawn by the technical idea of the present invention in addition to the embodiments disclosed herein are included in the scope and spirit of the present invention as defined by the appended claims and their equivalents.

What is claimed is:

1. A method of sharing location information of an electronic device, the method comprising:
   receiving a request for sharing the location information;
   determining a sharing level of a party upon the receipt of the request for sharing the location information;
   obtaining the location information of the electronic device; and
   changing the obtained location information into location information corresponding to the sharing level of the party and transmitting the changed location information, wherein determining the sharing level further comprises adjusting the sharing level by comparing status information registered in an application with current status information of the electronic device.

2. The method of claim 1, wherein determining the sharing level comprises, if the sharing level information of the other party is registered in the contact information, determined the sharing level based on the contact information.

3. The method of claim 1, wherein adjusting the sharing level comprises, if a difference value, which is calculated by comparing the status information registered in the application with the current status information, is within an adjustment critical value, adjusting the sharing level.

4. The method of claim 3, wherein, determining the sharing level further comprises, if the difference value is not within the adjustment critical value, determining the sharing level as a default level.

5. The method of claim 3, wherein the status information comprises time information or location information.

6. The method of claim 3, wherein the executed application comprises applications of a schedule, a memo, a message, an e-mail, a Social Networking Service (SNS) and an instant messenger.

7. The method of claim 5, further comprising, if the time information exceeds a current time, when the request for sharing the location information is received, the location information corresponding to the sharing level is not transmitted.

8. The method of claim 1, wherein obtaining the location information of the electronic device comprises obtaining by using at least one of a Global Positioning System (GPS), a Wireless Fidelity Positioning System (WPS), a Sensor Positioning System (SPS) and a cell identifier (cell-ID) of a cellular network.

9. The method of claim 8, wherein changing the obtained location information of the electronic device comprises checking mapping information corresponding to the determined sharing level and changing the location information by using the mapping information.

10. The method of claim 9, wherein the mapping information comprises a geographical coordinate, regional zone information and the cell-ID.

11. An apparatus for sharing location information of an electronic device, the apparatus comprising:

a communication unit configured to receive a request for sharing the location information and transmit the location information;

a Global Positioning System (GPS) receiver configured to receive current location information of the electronic device;

a sensor unit configured to detect movement and a speed of the electronic device to receive a location change; and a controller configured to receive the request for sharing the location information via the communication unit, determine a sharing level of a party upon the receipt of the request for sharing the location information, obtain the location information of the electronic device, change the obtained location information into location information corresponding to the sharing level of the party, and transmit the changed location information, wherein the controller is further configured to adjust the sharing level by comparing status information registered in an application with current status information of the electronic device.

12. The apparatus of claim 11, wherein the controller is further configured to, if the sharing level information of the party is registered in the contact information, determine the sharing level based on the contact information, and if an executed application providing the location information includes the sharing level information, determine the sharing level based on the sharing level of the executed application.

13. The apparatus of claim 12, wherein the controller is further configured to, if a difference value, which is calculated by comparing status information registered in the executed application with current status information, is within an adjustment critical value, adjust the sharing level, and if the difference value is not within the adjustment critical value, determine the sharing level as a default level.

14. The apparatus of claim 11, the controller is further configured to obtain the location information by using at least one of the GPS, a Wireless Fidelity Positioning System (WPS), a Sensor Positioning System (SPS) and a cell identified (cell-ID) of a cellular network.

15. The apparatus of claim 14, wherein the controller is further configured to check mapping information corresponding to the determined sharing level, and change the determined location information into location information corresponding to the sharing level by using the mapping information.

* * * * *